Dec. 24, 1946.  J. B. MALIN  2,413,111
FUEL INJECTION DEVICE FOR INTERNAL-COMBUSTION ENGINES
Filed June 26, 1944
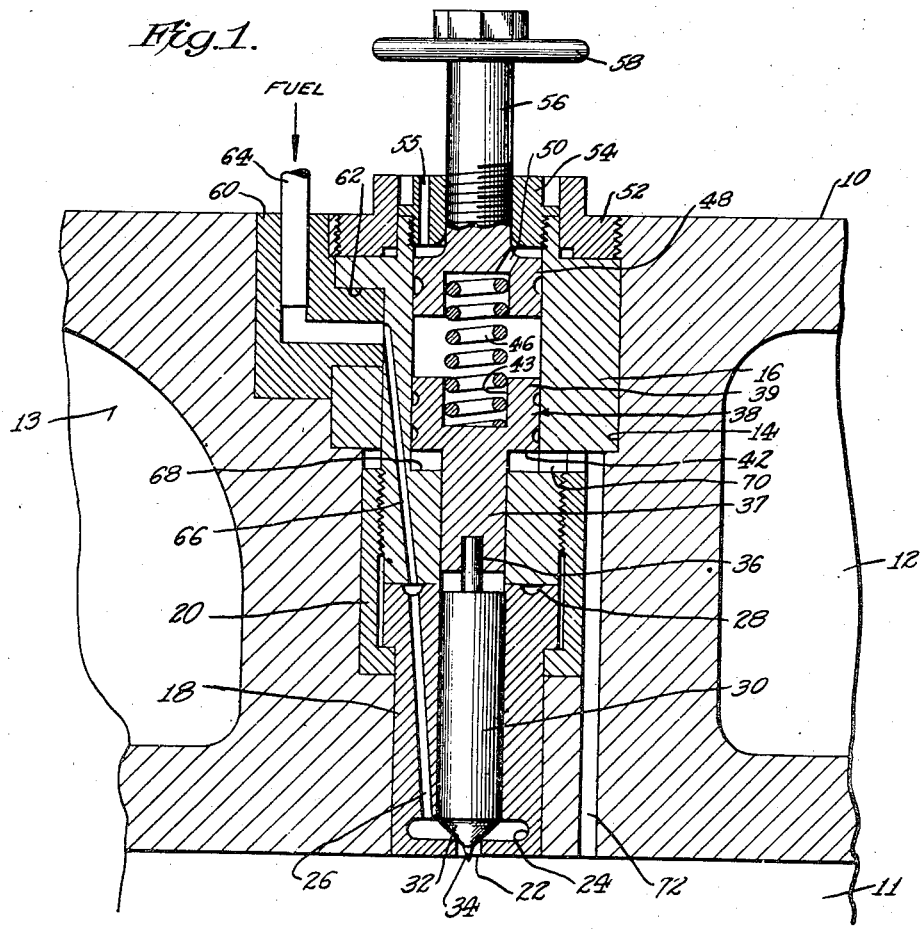
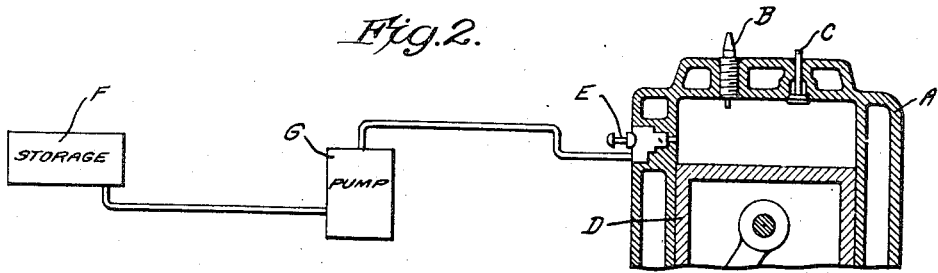
INVENTOR.
JAY B. MALIN
BY
ATTORNEYS Patented Dec. 24, 1946

2,413,111

UNITED STATES PATENT OFFICE 2,413,111

FUEL INJECTION DEVICE FOR INTERNAL-COMBUSTION ENGINES

Jay B. Malin, Fishkill, N. Y., assignor, by mesne assignments, to The Texas Company, New York, N. Y., a corporation of Delaware Application June 26, 1944, Serial No. 542,201

2 Claims. (Cl. 123—32)

This invention relates to the injection of fluid fuels into combustion chambers of internal combustion engines and is particularly concerned with an injector mechanism of the type in which the fuel is introduced at the high pressure of injection into the injector and functions to lift the pintle closing the orifice.

It is an object of the invention to provide means in conjunction with a high pressure fuel injector whereby a fluid fuel may be injected into an oxygen-containing gas to form a combustible mixture of controlled composition.

Another object of the invention is to provide means in such an injector whereby a fluid fuel may be injected into the combustion chamber of an internal combustion engine at a rate controlled in accordance with variations in the pressure existing in the combustion chamber.

A further object of the invention is to provide means in a high pressure fuel injector for injecting fuel over a selected period into the combustion chamber of an internal combustion engine wherein the fuel is burned substantially as soon as injected, whereby the rate of fuel injection may be controlled in accordance with pressure changes in the combustion chamber.

Other objects of the invention will in part be obvious and will in part appear hereinafter.

The injector mechanism of the present invention is particularly advantageous when employed with an internal combustion engine operated in accordance with the method disclosed in the application of Everett M. Barber, Serial No. 513,232, filed December 7, 1943. In this method, air, or air containing insufficient fuel to support combustion is introduced into the combustion chamber of an engine cylinder and is compressed therein. Fuel is injected into the compressed air at a point near the top of piston travel under conditions such that all or a part flash vaporizes or exists in vapor state to form a combustible fuel vapor-air mixture at the point of ignition. The amount and direction of fuel injection are controlled during the period of time from the injection to ignition so that the fuel mixes only with a localized portion of the air within the combustion space. The first increment of fuel which has formed a localized combustible mixture with the air is ignited before it has had an opportunity to disperse throughout the combustion chamber, and a flame front is formed. The remainder of the fuel is injected during the rest of the injection period, in advance of the flame front in its direction of burning.

In this method, it is important that there should be relative movement between the body of air and the point of fuel injection. Thus, the air in the combustion chamber may be caused to swirl and move past the point of injection; or the point or direction of burning may be moved so as to make possible the injection of fuel into the body of air in advance of the flame front. In any case, it will be seen that during the period of fuel injection, the pressure in the combustion chamber is increasing, due both to the action of the piston and the combustion of the fuel. Also, during the period of fuel injection, the density of the unconsumed air in the combustion space is increasing, and, therefore, in a given volume of air, more oxygen molecules will be present towards the end of injection than when injection is begun.

While the injection mechanism of the present invention is especially useful when employed for injecting fuel into the combustion chamber of an engine operated in accordance with this method, it is not limited to such use, since it may be employed in connection with other methods of engine operation wherein fuel is injected over a period of time.

In accordance with the invention, a fluid fuel is supplied to the injector at full injection pressure. The injector is so constructed that this pressure is caused to tend to raise a pintle member which is yieldingly held, for example, by means of a spring, in position to close the orifice of the nozzle of the injector. There is also provided means responsive to the pressure within the combustion chamber which acts to relieve the pressure of the spring and thereby permit further opening of the pintle member. This is preferably a piston in contact with the spring and the pintle member and having a surface, such as a shoulder, against which the pressure of the combustion chamber may act to relieve the force of the spring on the pintle member. Thus, the extent of opening of the nozzle is controlled by the pressure in the combustion chamber, and therefore the rate of fuel injection will vary in accordance with variations in the pressure in the combustion chamber.

The invention will be understood more fully by reference to the accompanying drawing in which:

Figure 1 is a sectional view of a preferred form of an injector in position in the engine cylinder; and Figure 2 is a diagrammatic illustration of an engine cylinder with fuel system, and illustrates a method of employing the injector of Figure 1.

Referring to Figure 1, the wall of an engine cylinder is shown at 10. This wall encloses the combustion space 11 of the cylinder. The cylinder wall contains sections 12 and 13 of a cooling chamber and has an opening 14 for the reception of the injector. The injector comprises a body portion 16 and a nozzle body portion 18, the two being held in engagement by means of a lock nut 20. These two portions together constitute the injector body and are separate units to expedite replacement of parts. The nozzle body portion is provided with an orifice 22 opening into the combustion chamber 11 of the cylinder. The nozzle body portion is also provided with a fuel chamber 24, and a channel 26 which leads into the fuel chamber and connects with a circular groove 28 in the top of the nozzle body portion. A nozzle pintle 30 having a conical lower end 32 and a pintle tip 34 is slidably disposed in the nozzle body. The conical lower end is normally seated on the inner end of the wall forming the orifice. By reason of this tapered tip cooperating with the valve seat in the manner disclosed, it will be obvious that a fuel feed control passage between said tip and the valve seat is provided which has progressively increasing cross-sectional area with increase in opening movement of the pintle valve. A guide 36 is set in the top of the nozzle pintle, and this has a sliding engagement with an extension 37 of a piston 38, which is disposed in body portion 16.

The piston 38 has an enlarged upper portion 39 having a shoulder 42 and a recess 43 forming a seat for a spring 46. The spring is held in place by a plunger 48 having an air-release port 50. A lock nut 52 serves to retain the injector body. A guide nut 54 is shown having threaded engagement with body portion 16. This guide nut has an air-release port 55 and is in threaded engagement with an extension 56 of plunger 48. Extension 56 is provided at its outer end with a handwheel 58. An angled insert 60 disposed in a recess 62 of body portion 16 holds a conduit 64 which conducts fuel into the injector. Leading from this conduit, there is a channel or conduit 66 in body portion 16 which opens into the groove 28 in the top of nozzle body portion 18.

As disclosed, the shoulder 42 of the piston 38 is held in spaced relation from a surface 68 of injector body portion 16 by means of guide 36. Thus, the shoulder 42, the surface 68 and the extension 37 of the piston form a chamber which may be referred to as a pressure chamber. Leading into this pressure chamber is a channel 70 in body portion 16. A channel 72, which is open to the combustion chamber of the cylinder, connects with channel 70, and therefore the pressure chamber is open to fluid flow from the combustion chamber of the engine.

In operation, the force with which the nozzle pintle is held in contact with the nozzle is adjusted to some predetermined value. This may be done by turning handwheel 58 which varies the compression on spring 46. Fuel is introduced at a selected high injection pressure, which may vary, for example, from 500 to 6,000 pounds per square inch, through fuel line 64 and thence through channels 66 and 26 to fuel chamber 24. The pressure on the fuel tends to lift the pintle by acting against its conical lower end, and, as discussed below, the force exerted by the fuel may or may not be sufficient to cause the initial raising of the pintle. The pressure existing in the combustion chamber is transmitted through channels 72 and 70 to the shoulder 42 of piston 38 and this acts through the piston to compress the spring and permit raising the pintle. Thus, there are two principal forces independently controlling the distance which the pintle is raised at any given time. Since the force due to the fuel pressure is preferably maintained substantially constant, the force supplied by the combustion chamber pressure effects variations in the amount of pintle lift. While the pressure in the chamber also acts against the pintle lift and the portion of the pintle nozzle extending beyond the seat, these surfaces are small in area and the resultant force is not sufficient to have a material effect upon the extent to which the pintle is lifted.

It will be seen that the relation between the force exerted by the fuel and that exerted by the pressure in the combustion chamber is established primarily by the relation between the effective area of the conical lower end of the nozzle pintle and the area of shoulder 42. Thus, this relation can be made any desired value in designing the injector. This relation is also affected by the values of the fuel pressure and the pressures in the combustion chamber. It will be understood, taking these factors into account, that the injector is designed so that the force exerted by the pressure in the combustion chamber is sufficient to effect substantial control upon the lifting of the pintle and therefore the flow of fluid through the orifice.

An example of the use of the injector in the method of application Serial No. 513,232 will be explained in connection with Figures 1 and 2. Referring to Figure 2, an engine cylinder is shown at A provided with a spark plug B, an exhaust valve C and an intake valve, not shown. A piston D having the usual connecting rod is shown in the cylinder. An injector E, which is preferably constructed as shown in Figure 1, is set in the wall of the cylinder. Fluid fuel for the operation of the engine is fed at a selected pressure to the injector from a storage tank F by means of a pump represented generally at G. This pump imparts a substantially constant pressure to the fuel and also has means to start and stop the application of the pressure.

The handwheel 58 (Figure 1) may be adjusted such that the force exerted by the spring is a selected amount greater than the force exerted by the fuel, this amount being equal to the force which will be exerted on the piston 38 by the pressure in the combustion chamber at the point in the compression stroke of the engine it is desired to start injection.

In this example, the air is introduced on the suction stroke, preferably through a shrouded intake valve to impart swirl to the air, and is compressed on the compression stroke while the swirl continues. At the desired point in the compression stroke, the pressure in the combustion chamber reaches a value such that the total of the forces acting to raise the pintle is sufficient to overcome the force exerted by the spring, and injection is begun. The first increment of fuel is injected into the swirling air under conditions such that at least a part rapidly vaporizes and forms a localized combustible fuel vapor-air mixture which is passed into contact with the electrodes of the spark plug and promptly ignites to form a flame front. Injection of the fuel is continued during the remainder of the injection period in advance of the flame front and is ignited substantially as soon as injected.

Due to the combustion of the fuel, and the action of the piston prior to top dead center, the pressure in the combustion chamber constantly increases during the period of injection. As a result, the distance which the pintle is raised from its seat is made greater. This permits an increase in the rate at which the fuel is injected. Accordingly, the rate of injection of the fuel is made to vary in accordance with variations in the pressure in the combustion chamber.

In the embodiment of the invention shown, it is important that the force exerted by the pressure in the combustion chamber at the highest point should not be sufficient to hold the nozzle open without the aid of the force exerted by the pressure on the fuel. To terminate the injection, the pressure on the fuel is released and the pintle is forced quickly onto its seat.

It will be understood, of course, that the invention is not limited to this manner of operating. For example, the fuel pressure may be such as to lift the pintle without the aid of the force exerted by the pressure in the chamber. In this case, the point of opening is determined by the impressment of this pressure on the fuel and the force exerted by the pressure in the combustion chamber is effective only to control the degree to which the pintle is raised. It will be seen that in this case also the rate of fuel injection is controlled in accordance with pressure changes in the combustion chamber.

The method of carrying out the non-knocking combustion, wherein the first increment of injected fuel is spark ignited to initiate combustion, and fuel injection is continued following combustion immediately in advance of the formed flame front, with the rate of fuel injection being increased directly in accordance with the increase in combustion space pressure during the injection period, is disclosed and claimed in the co-pending application of Everett M. Barber and Jay B. Malin, Serial No. 623,098, filed October 18, 1945.

Obviously many modifications and variations of the invention, as hereinbefore set forth, may be made without departing from the spirit and scope thereof, and therefore only such limitations should be imposed as are indicated in the appended claims.

I claim:

1. In an internal combustion engine, and in combination, a cylinder having a combustion space, a piston reciprocatingly mounted therein, an injector mechanism mounted in said cylinder, said mechanism comprising a nozzle having a fuel injection orifice and a valve seat behind said orifice, said nozzle also having a pressure chamber formed therein behind said valve seat and a fuel passage leading thereto, a pintle valve slidably mounted within the said nozzle and cooperating with said valve seat, said pintle valve having an inclined tip adapted to form a fuel feed control passage between said tip and said valve seat of progressively increasing cross-sectional area with increase in opening movement of said valve and which is effective to regulate the rate of fuel injection throughout the normal range of movement of said valve, said pintle valve also having a surface of effective cross-sectional area exposed to said pressure chamber so that fuel under pressure therein produces a thrust tending to effect opening movement of said valve, a piston slidably mounted within said nozzle behind said pintle valve, an operative and loose connection between said piston and said pintle valve, an adjustable plunger carried by said nozzle behind said piston, a compression spring mounted between said plunger and said piston and resisting opening movement of said valve, said nozzle also having a second pressure chamber formed therein exposed to the front side of said piston, said parts being formed with a passage independent of said orifice and said fuel pressure chamber providing communication between said second pressure chamber and said cylinder combustion space, and means for supplying fuel under pressure to said fuel passage and first-mentioned pressure chamber at an intermediate point in the compression stroke of said first-mentioned piston, said parts being constructed and arranged to effect initial but only partial opening movement of said valve at the instant in said cycle when said fuel under pressure is supplied to said first-mentioned pressure chamber to initiate fuel injection at a lower rate, and thereafter increasing combustion space pressure during the injection period of each said cycle is communicated to said second pressure chamber to force said second mentioned piston toward said plunger and thereby relieve thrust of said spring on said pintle valve to produce additional opening movement of said valve with consequent increase in the rate of fuel injection during the injection period of each said cycle in accordance with the increase in combustion space pressure.

2. In an internal combustion engine, and in combination, a cylinder having a combustion space, a piston reciprocatingly mounted therein, an injector mechanism mounted in said cylinder, said mechanism comprising a nozzle having a fuel injection orifice and a valve controlling said orifice, said valve cooperating with said orifice to form a fuel feed control passage of progressively increasing cross-sectional area with increase in opening movement of said valve and which is effective to regulate the rate of fuel injection throughout the normal range of movement of said valve, said nozzle having a fuel passage therein communicating with said valve whereby the pressure of the fuel exerts a thrust on said valve in the direction of opening movement thereof, said parts also having a passage providing communication between said combustion space and said valve whereby the pressure in said combustion space also exerts a thrust on said valve in the direction of opening movement thereof, resilient means for exerting a counterthrust on said valve tending to hold the valve in closed position, means for adjusting the force of said counterthrust, and means for supplying fuel under pressure to said fuel passage and valve at an intermediate point in the compression stroke of said piston, said parts being constructed and arranged to effect initial but only partial opening movement of said valve at the instant in the cycle when said fuel under pressure is supplied to said fuel passage and valve to initiate fuel injection at a lower rate, and thereafter increasing combustion space pressure during the injection period of said cycle effects additional opening movement of said valve with consequent increase in the rate of fuel injection during the injection period of said cycle in accordance with the increase in combustion space pressure.

JAY B. MALIN.